United States Patent Office 3,256,363
Patented June 14, 1966

3,256,363
POLYPROPYLENE BLENDS CONTAINING DYE MODIFIERS CONSISTING OF ALKALI METAL SULFONATES OF PHENOXYALKOXYPHENYLDICARBOXYLIC ACID AND 9,9-DI-(CARBOXYALKYL)-FLUORENES AND THEIR LOW MOLECULAR WEIGHT POLYESTERS
Christian F. Horn, South Charleston, and Harrison S. Kincaid, Nitro, W. Va., assignors to Union Carbide Corporation, a corporation of New York
No Drawing. Filed Apr. 23, 1962, Ser. No. 189,301
20 Claims. (Cl. 260—873)

This invention relates to new and valuable polyolefin compositions. More particularly, it is concerned with polypropylene compositions which can be used to produce fibers which are readily dyed by conventional dyeing techniques, and films having improved dyeability and printability.

Fibers of polypropylene, both homopolymeric and copolymeric, are well known. However, these fibers are very difficult to dye and, in general, defy dyeing by the conventional procedures. Several approaches have been taken in attempts to improve the dyeability of polypropylene; for example, graft polymerization with dye-receptive comonomers has been tried but this has affected the spinnability of the polymer and has not been commercially practical. Attempts have also been made to improve dyeability by blending the polypropylene with polyurethanes, polyamides, epoxy resins, and the like—again, with little or no success. At most, these procedures have resulted in moderate improvements in dyeability but these improvements have been offset by other problems, such as poor compatibility, resulting in poor product uniformity and spinning problems. Further, the dyeings obtained have not been satisfactory in depth of shade or fastness properties. Films made from the polyolefin resins have been found to be difficult to print on, and expensive and time consuming procedures, such as flame treatment or radiation, have been employed to improve the printability properties of such films. Also, in some instances it has been difficult to seal the edges of the films after such treatments.

It has now been found that polypropylenes suitable for use in the production of fibers can be rendered dye-receptive by incorporating in them a minor amount of a particular modifier. It has also been found that films of improved printability can be produced from the blends herein contemplated.

The polypropylenes used to prepare the polypropylene compositions of this invention are the solid polymers having a density of above about 0.89 g./cc. and a melt index below about 100 dgm./min. as determined at 230° C. Copolymers of propylene with other alpha olefins can also be used.

The modifiers blended with polypropylene to produce the compositions of this invention are the sulfonates of certain dicarboxylic acid compounds, and the lower molecular weight polyesters thereof.

The sulfonates are the alkali metal sulfonates of the phenoxyalkoxyphenylcarboxylic acid compounds having the formula

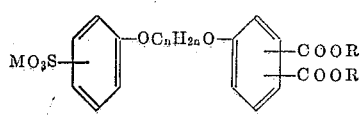
(I)

and the alkali metal sulfonates of the 9,9-di-(carboxyalkyl)-fluorene compounds having the formula

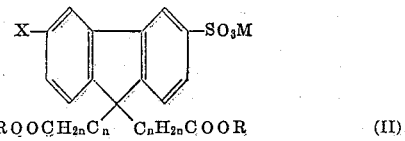
(II)

wherein M is an alkali metal such as lithium, sodium, potassium, or cesium; X is a hydrogen atom or an —SO₃M group; R is an alkyl radical having from 1 to about 10 carbon atoms, such as methyl, ethyl, propyl, isopropyl, butyl, isobutyl, pentyl, hexyl, neohexyl, 2-methylpentyl, heptyl, octyl, 2-ethylhexyl, decyl, and the like; and $n$ is an integer having a value of from 2 to about 5.

The alkali metal sulfonates of the phenoxyalkoxyphenyldicarboxylic acid compounds of Formula I can be prepared most readily by the sulfonation of the corresponding phenoxyalkoxyphenyldicarboxylic acid compounds of the formula

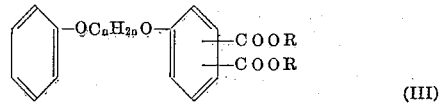
(III)

These latter are known compounds readily obtained, for example, by the reaction of a phenoxyalkylhalide with an alkali metal dicarboxyphenolate or an alkali metal dicarboalkoxyphenolate as known in the art.

Illustrative of the compounds of Formula I one can mention:

Dimethyl 4-(4-sodiumsulfophenoxyethoxy)phthalate,
Dioctyl 4-(4-sodiumsulfophenoxyethoxy)phthalate,
Dimethyl 4-(4-postassiumsulfophenoxyethoxy)phthalate,
Dimethyl 4-(4-potassiumsulfophenoxybutoxy)phthalate,
Dimethyl 5-(4-sodiumsulfophenoxyethoxy)terephthalate,
Dimethyl 5-(4-potassiumsulfophenoxyethoxy)-
  terephthalate,
Dipropyl 5-(4-potassiumsulfophenoxyethoxy)-
  terephthalate,
Di-2-ethylhexyl 5-(4-sodiumsulfophenoxyethoxy)-
  terephthalate,
Dimethyl 5-(4-sodiumsulfophenoxypropoxy)-
  terephthalate,
Dimethyl 5-(4-sodiumsulfophenoxypentanoxy)-
  terephthalate,
Dimethyl 5-(4-sodiumsulfophenoxyethoxy)isophthalate,
Dimethyl 5-(4-lithiumsulfophenoxyethoxy)isophthalate,
Dimethyl 5-(4-potassiumsulfophenoxyethoxy)-
  isophthalate,
Dimethyl 5-(4-cesiumssulfophenoxyethoxy)isophthalate,
Dibutyl 5-(4-potassiumsulfophenoxyethoxy)isophthalate,
Dioctyl 5-(4-potassiumsulfophenoxyethoxy)isophthalate,
Didecyl 5-(4-potassiumsulfophenoxyethoxy)isophthalate,
Dimethyl 5-(4-sodiumsulfophenoxypropoxy)-
  isophthalate,
Dimethyl 5-(4-sodiumsulfophenoxybutanoxy)-
  isophthalate,
Dimethyl 5-(4-sodiumsulfophenoxypentanoxy)-
  isophthalate, and the like.

Illustrative of the compounds of Formula II one can mention:

Lithium 9,9-di-(2-carbomethoxyethyl)-fluorene-2-
  sulfonate,
Sodium 9,9-di-(2-carbomethoxyethyl)-fluorene-2-
  sulfonate,
Potassium 9,9-di-(2-carbomethoxyethyl)-fluorene-2-
  sulfonate,
Cesium 9,9-di-(2-carbomethoxyethyl)-fluorene-2-
  sulfonate, Rubidium 9,9-di-(2-carbomethoxyethyl)-fluorene-2-sulfonate,
Sodium 9,9-di-(3-carbomethoxypropyl)-fluorene-2-sulfonate,
Potassium 9,9-di-(4-carbomethoxybutyl)-fluorene-2-sulfonate,
Sodium 9,9-di-(5-carbomethoxypentyl)-fluorene-2-sulfonate,
Sodium 9,9-di-(2-carboethoxyethyl)-fluorene-2-sulfonate,
Sodium 9,9-di-(2-carbopropoxyethyl)-fluorene-2-sulfonate,
Sodium 9,9-di-(2-carbopropoxyethyl)-fluorene-2-sulfonate,
Sodium 9,9-di-(2-carbopentanoxyethyl)-fluorene-2-sulfonate,
Sodium 9,9-di-(2-carbooctanoxyethyl)-fluorene-2-sulfonate,
Sodium 9,9-di-(2-carbodecanoxyethyl)-fluorene-2-sulfonate,
Sodium 9,9-di-(2-carboisopropoxyethyl)-fluorene-2-sulfonate,
Potassium 9-(2-carboethoxyethyl)-9-(5-carboethoxypentyl)-fluorene-2-sulfonate,
Sodium 9-(2-carbopentanoxyethyl)-9-(4-carbopentanoxybutyl)-fluorene-2-sulfonate,
Disodium 9,9-di-(2-carbomethoxyethyl)-fluorene-2,7-disulfonate,
Disodium 9,9-di-(2-carbobutanoxyethyl)-fluorene-2,7-disulfonate,
Disodium 9,9-di-(2-carboheptanoxyethyl)-fluorene-2,7-disulfonate,
Disodium 9,9-di-(2-carbononanoxyethyl)-fluorene-2,7,-disulfonate,
Disodium 9,9-di-(3-carbomethoxypropyl)-fluorene-2,7-disulfonate,
Disodium 9,9-di-(5-carboethoxypentyl)-fluorene-2,7-disulfonate,
Dilithium 9,9-di-(2-carbomethoxyethyl)-fluorene-2,7-disulfonate,
Dipotassium 9,9-di-(2-carbomethoxyethyl)-fluorene-2,7-disulfonate,
Dicesium 9,9-di-(2-carbomethoxyethyl)-fluorene-2,7-disulfonate,
Dirubidium 9,9-di-(2-carboethoxyethyl)-fluorene-2,7-disulfonate,
Disodium 9-(2-carbomethoxyethyl)-9-(3-carbomethoxypropyl)-fluorene-2,7-disulfonate,
Disodium 9-(2-carboethoxyethyl)-9-(3-carbopropoxypropyl)-fluorene-2,7-disulfonate,
Dipotassium 9,9-di-(2-carbodecanoxyethyl)-fluorene-2,7-disulfonate, and the like.

These latter compounds are readily produced by the sulfonation of the free acids or esters of the 9,9-di-(carboxyalkyl)-fluorenes having the formula

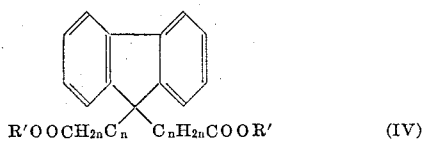

R'OOCH$_{2n}$C$_n$  C$_n$H$_{2n}$COOR'  (IV)

in which R' is hydrogen or alkyl. If the free acid is used it is then readily converted by conventional procedures to the esters corresponding to Formula II.

The sulfonation reactions can be carried out using sulfuric acid. The phenoxyalkylphenylcarboxylic acid sulfonates (I) can be produced by sulfonating the corresponding III compounds at —15° C. to 50° C. with a mixture of sulfuric acid and acetic anhydride, preferably in an inert organic diluent such as methylene dichloride, ethyl acetate, and the like. The mole ratio of sulfuric acid to acetic anhydride can vary from about 0.1:1 to 1:1 with ratios of 0.2:1 to 0.6:1 preferred. The mole ratio of sulfuric acid to phenoxyalkoxyphenyldicarboxylic acid compound (III) can vary from about 0.5:1 to 5:1 with ratios of 0.8:1 to 1.5:1 preferred. After sulfonation the alkali metal salts are readily produced.

The 9,9-di-(carboxyalkyl)-fluorenes (IV) are sulfonated at temperatures up to about 150° C. At temperatures up to about 65° C. monosulfonation predominates and yields of 80 percent or better of the monosulfonic acid compound are obtained. At temperatures above about 65° C., and preferably from about 90° C. to about 130° C., disulfonation is the predominating reaction with small amounts of monosulfonic acid compound being produced. The ratio of sulfuric acid to 9,9-di-(carboxyalkyl)fluorene compound can vary from about 1:1 to 10:1 with ratios of about 2:1 preferred in the production of the monosulfonic acid compounds and ratios above about 4:1 preferred for the production of the disulfonic acid compounds.

In either sulfonation reaction a catalyst such as mercury, mercuric sulfate, vanadium pentoxide, et cetera, can be used if desired.

As previously indicated, the sulfonates of compounds I and II can be blended per se with polypropylene to improve the dyeability and printability thereof. It was also indicated that low molecular weight polyesters of said sulfonates have the same effect as modifiers.

The polyester modifiers are produced by conventional procedures from an aromatic dicarboxylic acid- or ester-forming derivative thereof; a diol, such as an alicyclic diol, an aromatic diol, an aliphatic-aromatic diol, an aliphatic glycol, or a diester thereof; and the sulfonated dicarboxylic acid compounds defined by Formulas I and II. Polyesters produced from the diol and the sulfonated dicarboxylic acid compounds of formulas I and II are also suitable.

Among the suitable diols for the production of the polyesters one can mention the aliphatic diols of the general formula HO(C$_n$H$_{2n}$)OH wherein $n$ is an integer of from 2 to 10, such as ethylene glycol, trimethylene glycol, pentamethylene glycol, hexamethylene glycol, decamethylene glycol, propylene glycol, 3-methyl-1,5-pentane glycol, 2-ethyl-1,6-hexane diol, and the like. Also suitable are 1,4-cyclohexanedimethanol, p-xylylene glycol, hydroquinone diacetate, 4-hydroxybenzyl alcohol, and the like. It is known that any glycol of an aliphatic nature, whether or not it contains aromatic nuclei, can be used in the production of linear polyesters. Thus the term aliphatic glycol includes all those glycols of an aliphatic nature which are known to the art to be suitable.

Suitable dicarboxylic acid compounds are the aromatic and aliphatic dicarboxylic acids, which are well known to those skilled in the art. The most preferred dicarboxylic acids are terephthalic acid, sebacic acid, azeleic acid, adipic acid, and the dialkyl esters thereof, such as dimethyl terephthalate, dimethyl sebacate, and similar esters in which the alkyl groups preferably contain from 1 to about 5 carbon atoms. Other suitable dicarboxylic acids or their esters which can be used are:

Isophthalic acid,
5-methylisophthalic acid,
p,p'-Diphenylcarboxylic acid,
p,p'-Dicarboxydiphenyl hexane,
Bis-(dicarboxypentyl) sulfide,
Bis-(dicarboxyhexyl) sulfone,
Bis-(dicarboxybutyl) ether,
p,p'-Dicarboxyphenoxy butane,
2-methyladipic acid,
3-ethylpimelic acid,
Succinic acid,
1,2-eicosane dioic acid,
Dodecane dioic acid, and the like.

In preparing the polyesters, at least about a 1.3:1 molar ratio of glycol to dicarboxylic acid compounds is used. However, an excess of glycol to dicarboxylic acids, ranging from about 2 to 10 moles of glycol per mole of dicarboxylic acid compounds can be used. A more satisfactory ratio is from about 1.3 to 7 moles, with ratios of from about 1.5 to about 5 moles of glycol per mole of dicarboxylic acid compounds preferred.

The amount of sulfonated dicarboxylic acid compound present in the polyesters can be varied from about 5 to about 80 mole percent or more. Amounts ranging from 15 to 70 mole percent are preferred.

In the production of the polyesters, the calculated amounts of aryl dicarboxylic acid compound, glycol, sulfonated fluorene modifier, and catalyst are charged to a reactor and heated at a temperature of from about 150° C. to about 270° C., preferably from about 170° C. to about 250° C., in an inert atmosphere to effect the initial ester interchange reaction. Then whatever excess glycol is left is removed by heating to about 280° C. at reduced pressure in an inert atmosphere or by passing a stream of an inert gas through the melt at atmospheric pressure. Thereafter the polycondensation is carried out at from about 225° C. to about 325° C., preferably from about 260° C. to about 290° C., and at reduced pressures of from about 0.1 mm. to about 20 mm. of mercury, preferably from about 0.1 mm. to about 5 mm., also in an inert atmosphere. If desired, the entire reaction can be carried out at atmospheric pressure while bubbling a stream of inert gas through the molten mixture; the rate of gas flow being increased as the polycondensation proceeds. The total reaction perod can be from about one to twelve hours, according to the catalyst employed and its concentration, the temperature, the pressure, the starting monomers, the viscosity desired for the polyester, and so forth, as is known in the art.

The monomers are preferably reacted in contact with a suitable catalyst in order to shorten the reaction period and thus lessen the possibility of discoloration. Any of the well known polyesterification catalysts can be used, such as antimony oxide, zinc acetate, manganese acetate, cobaltous acetate, zinc succinate, zinc borate, magnesium methoxide, sodium methoxide, barium oxide, cadmium formate, litharge, dibutyltin oxide, tetraisopropyl titanate, calcium titanium silicate, and the like. The concentration of the catalyst can be varied from about 0.001 percent to about 1 percent by weight of the total amount of dicarboxylic acid compounds charged. A preferred amount is from about 0.005 percent to about 0.5 percent by weight; with the most preferred amount being from about 0.01 percent to about 0.2 percent by weight.

Other materials can be present in the reaction mixture, for example, color inhibitors, such as alkyl or aryl phosphite esters; or pigments, delusterants or other additives, such as titanium dioxide or barium carbonate; or viscosity stabilizers.

The reduced viscosity, $I_R$, of the polyesters of this invention is determined by the equation:

$$I_R = \frac{N}{N_0} \times \frac{1}{C}$$

wherein N is the difference between the flow time of the solution and the flow time of the solvent, $N_0$ is the flow time of the solvent, and C is the concentration of the polymer in grams per 100 milliliters of solution. The reduced viscosities reported in this application were obtained at a polymer concentration of 0.2 gram per 100 milliliters of solution using a 3:2 mixture of phenol and tetrachloroethane as the solvent. The reduced viscosity of the polyesters can vary from about 0.01 to about 0.6, with values from about 0.03 to about 0.25 preferred.

The polypropylene compositions of this invention contain from about 1 to about 30 percent by weight of the modifier, i.e., the alkali metal sulfonate of a phenoxyalkoxyphenyldicarboxylic acid compound (I) or the alkali metal sulfonate of a 9,9-di-(carboxyalkyl)-fluorene compound (II), and from about 99 to about 70 percent by weight of the propylene polymer. Preferably the modifier content is from about 1.5 to about 20 percent by weight and the propylene polymer concentration from 98.5 to 80 percent by weight; with the most preferred modifier concentration being from about 2.5 to 13 percent by weight and the propylene polymer concentration from 97.5 to 87 percent by weight. The concentrations referred to are concentrations of the alkali metal sulfonate salts I or II in the blend either in the monomeric form per se or in the polymeric form as a low molecular weight polyester.

The improved compositions of this invention are homogeneous blends and can be prepared by mixing the solid polymers in conventional mixing equipment such as dough mixers, roll mixers, or Banbury mixers; by extrusion; or by fluxing the solid polymers. If desired, solution mixing can be used by proper selection of solvents. During this blending procedure antioxidants, heat stabilizers, delusterants, and other known additives can be added to the compositions.

The blends of this invention produce fibers which are readily dyed by disperse or cationic dyestuffs. By comparison polypropylene fibers are only slightly dyed by some disperse dyestuffs and not dyed by most of the cationic dyestuffs. Similarly, blends of polypropylene with polyesters other than those herein defined also have poor dyeing characteristics. Films or flat surfaces of the polypropylene blends of this invention are readily printable, whereas prior known polypropylene compositions required special surface treatment.

Fibers can be spun from the polypropylene compositions of this invention by conventional spinning techniques; for example, the compositions can be melt spun or solution spun and the filaments can then be stretched to orient the molecules and develope the desired tensile properties in the fibers. The fibers produced from the compositions of this invention can be employed in the many applications in which synthetic fibers are used. These fibers are more readily dyed by conventional dyeing techniques to shades which are much deeper than have heretofore been obtainable on polypropylene fibers.

In a typical dyeing procedure with disperse dyes, a 50:1 dye bath ratio is used, the bath containing 1 percent by weight of a 28 percent solution of sodium N-methyl-N-oleoyl taurate and 3 percent of the dye, based on the weight of the fabric. The dyeing was carried out for ninety minutes at the boil and the fabric was then rinsed thoroughly and dried. When a cationic dye is used the dye bath contains 1 percent alkyl phenyl polyethylene glycol ether and 3 percent of the dye; the dye having been pasted with 0.25 percent glacial acetic acid before dissolution.

The amount of dye on the fiber was compared with control dyeings by determination of the $K/S$ values, obtained from the reflectance of the dyed samples. Reflectance was determined with a Colormaster Colorimeter using a green filter for the disperse dyeings and a red filter for the cationic dyeings. The larger the $K/S$ value, the deeper the shade, and a $K/S$ value of 20 indicates that the shade is approximately twice as deep as the shade represented by a $K/S$ value of 10. The determination of the $K/S$ values is set forth in an article by D. B. Judd, "Color in Business," Science and Industry, 1952, pages 314 to 342. Among the dyes that can be used to dye the fibers of this invention are the following.

Acid:

| | |
|---|---|
| Yellow 1 | C.I. 10,316 |
| Yellow 3 | C.I. 47,005 |
| Yellow 7 | C.I. 56,205 |
| Yellow 11 | C.I. 18,820 |
| Yellow 23 | C.I. 19,140 |
| Yellow 29 | C.I. 18,900 |
| Yellow 36 | C.I. 13,065 |
| Yellow 42 | C.I. 22,910 |
| Yellow 54 | C.I. 19,010 |
| Yellow 99 | C.I. 13,900 |

Acid:
- Orange 1 _____ C.I. 13,090/1
- Orange 7 _____ C.I. 15,510
- Orange 10 _____ C.I. 16,230
- Orange 24 _____ C.I. 20,170
- Orange 49 _____ C.I. 23,260
- Orange 72 _____ C.I. 18,740
- Orange 74 _____ C.I. 18,745
- Red 1 _____ C.I. 18,050
- Red 12 _____ C.I. 14,835
- Red 14 _____ C.I. 14,720
- Red 26 _____ C.I. 16,150
- Red 34 _____ C.I. 17,030
- Red 37 _____ C.I. 17,045
- Red 73 _____ C.I. 27,290
- Red 85 _____ C.I. 22,245
- Red 89 _____ C.I. 23,910
- Red 115 _____ C.I. 27,200
- Red 116 _____ C.I. 26,660
- Red 134 _____ C.I. 24,810
- Red 179 _____ C.I. 19,351
- Violet 1 _____ C.I. 17,025
- Violet 7 _____ C.I. 18,055
- Violet 17 _____ C.I. 42,650
- Violet 43 _____ C.I. 60,730
- Blue 1 _____ C.I. 42,045
- Blue 9 _____ C.I. 42,090
- Blue 22 _____ C.I. 42,755
- Blue 25 _____ C.I. 62,055
- Blue 59 _____ C.I. 50,315
- Blue 83 _____ C.I. 42,660
- Blue 102 _____ C.I. 50,320
- Green 1 _____ C.I. 10,020
- Green 3 _____ C.I. 42,085
- Green 16 _____ C.I. 44,025
- Green 20 _____ C.I. 20,495
- Green 50 _____ C.I. 44,090
- Brown 14 _____ C.I. 20,195
- Brown 42 _____ C.I. 14,251
- Black 1 _____ C.I. 20,470
- Black 24 _____ C.I. 26,370
- Black 48 _____ C.I. 65,005
- Black 52 _____ C.I. 15,711

Basic:
- Yellow 1 _____ C.I. 49,005
- Yellow 9 _____ C.I. 46,040
- Orange 2 _____ C.I. 11,270
- Orange 15 _____ C.I. 46,045
- Red 1 _____ C.I. 45,160
- Red 9 _____ C.I. 42,500
- Violet 1 _____ C.I. 42,535
- Violet 3 _____ C.I. 42,555
- Violet 14 _____ C.I. 42,510
- Blue 5 _____ C.I. 42,140
- Blue 7 _____ C.I. 42,595
- Blue 26 _____ C.I. 44,045
- Green 4 _____ C.I. 42,000
- Brown 2 _____ C.I. 21,030

Disperse:
- Yellow 1 _____ C.I. 10,345
- Yellow 3 _____ C.I. 11,855
- Yellow 31 _____ C.I. 48,000
- Orange 1 _____ C.I. 11,080
- Orange 3 _____ C.I. 11,005
- Orange 7 _____ C.I. 11,240

Disperse:
- Red 1 _____ C.I. 11,110
- Red 4 _____ C.I. 60,755
- Red 11 _____ C.I. 62,015
- Red 13 _____ C.I. 11,115
- Red 15 _____ C.I. 60,710
- Red 17 _____ C.I. 11,210
- Violet 1 _____ C.I. 61,100
- Violet 4 _____ C.I. 61,105
- Violet 8 _____ C.I. 62,030
- Violet 13 _____ C.I. 11,195
- Blue 1 _____ C.I. 64,500
- Blue 3 _____ C.I. 61,505
- Blue 7 _____ C.I. 62,500
- Black 1 _____ C.I. 11,365
- Black 7 _____ C.I. 11,035 and the like. The Colour Index numbers are those listed in the latest Colour Index.

The polypropylene compositions of this invention are readily extruded by conventional procedures to produce fibers, rods, films, and protective coatings. The films so obtained are amenable to printing by conventional procedures without any further surface treatment of the film being necessary.

The modifiers added to the propylene polymers to produce the polypropylene compositions of this invention are readily compatible with the propylene polymers and relatively clear, tough compositions are obtained. These blends show little sweatout on heating, good product uniformity, improved printability, reduced fibrillation, and many other desirable properties.

The following test procedures were used in the determination of the physical properties of the compositions of this invention:

Melt index, at 230° C. _____ ASTM D1238–57
Density _____ ASTM D1505–57
Elongation _____ ASTM D638–56
Stiffness _____ ASTM D638–56

The following experiments illustrate the production of the alkali metal sulfonates.

EXPERIMENT A

To 250 milliliters of ethanol, contained in a 500 milliliter, 4-necked flask equipped with a stirrer, thermometer, condenser, and stopper, there were slowly added 10.8 grams of sodium methylate. The mixture was stirred until all of the sodium methylate was dissolved. Thereafter, 42 grams of dimethyl 5-hydroxyisophthalate were slowly added to the solution, which was then heated at reflux for a period of twenty minutes. Subsequently, 42 grams of phenoxyethyl bromide were slowly added to solution, and the resulting mixture was refluxed for a period of three hours. Upon completion of the reflux period, ethanol was distilled off to a kettle temperature of 94° C., accompanied by the formation of a sodium bromide precipitate. Heating was continued at a temperature of 94° C. for a period of two hours, whereupon additional ethanol was distilled off until the kettle temperature reached 130° C. The reflux condenser was removed and the mixture was heated at a temperature of 120° C. for a period of one hour, then allowed to stand overnight at room temperature. Acetone (250 milliliters) was thereafter added to the mixture, which was then refluxed for a period of ten minutes. Upon cooling, 20 grams of insoluble sodium bromide was filtered from the mixture. Acetone was removed from the filtrate by evaporation on a steam bath, and the residue was transferred to a distillation flask, whereupon unreacted phenoxyethyl bromide was distilled off to a kettle temperature of 185° C., under a reduced pressure of 4 millimeters of mercury. The residue was dissolved in 600 milliliters of diethyl ether, and resulting solution was washed with 200 milliliters of 5 percent aqueous sodium hydroxide, and then dried over anhydrous sodium sulfate. After the drying agent was removed by filtration, ether was removed from the filtrate by evaporation. In this manner, there were obtained about 42 grams dimethyl 5-(2-phenoxyethoxy)isophthalate as a viscous liquid.

To a 4-necked flask similar to that described above, and equipped with a dropping funnel instead of a stopper, there were charged 28.5 grams of acetic anhydride. The anhydride was cooled to 0° C., whereupon 14 grams of sulfuric acid were added dropwise thereto, accompanied by stirring and continued cooling, so that the temperature of the resulting mixture was maintained at about 0° C. To this mixture, there was slowly added a solution containing 42 grams of dimethyl 5-phenoxyethoxyisophthalate, obtained as described above, dissolved in 200 milliliters of ethylene dichloride. After stirring the resulting solution for a period of four hours at a temperature maintained in the range of from 0° C. to °5 C., the solution was gradually warmed to room temperature over a three-hour period. Thereafter, 200 milliliters of ethanol were added to the solution, which was then refluxed for a period of twenty minutes to esterify the acid present, including the acetic anhydride component of the sulfonating agent. The solution was subsequently transferred to an evaporating dish, from which the solvent present was evaporated upon standing overnight. In this manner dimethyl 5-[2-(4-sulfophenoxy)ethoxy]isophthalate was obtained as a residue product. The residue was then dissolved in 300 milliliters of methanol, transferred to a reaction flask, and refluxed for a period of five hours, while distilling off methyl acetate and any trace of ethylene dichloride still present. During the distillation, methanol was added to the solution to maintain a constant volume of about 400 milliliters. Thereafter, the solution was treated with charcoal, cooled to about room temperature and titrated with methanolic sodium hydroxide to a pH of 7.2. The mixture was diluted to 1.2 liters with methanol, heated to reflux and filtered while hot to remove traces of insoluble material. Methanol was then distilled off until approximately 400 milliliters of solution remained, whereupon the solution was cooled to room temperature. A precipitate was formed and was recovered by filtration. In this manner 32 grams of dimethyl 5-[2-(4-((sodiumsulfo))phenoxy)ethoxy]isophthalate were obtained as a white, crystalline product having a melting point of 335° C. to 340° C. *Analysis.*—Calculated for $C_{18}H_{17}O_9SNa \cdot O \cdot 5H_2O$: C, 48.98; H, 4.11. Found: C, 49.98; H, 4.22. Infrared analysis was consistent with the identity of the product.

EXPERIMENT B

To 500 milliliters of ethanol, contained in a 2-liter, 4-necked flask equipped with a stirrer, thermometer, condenser, and stopper, there were slowly added 20.4 grams of sodium. The mixture was stirred until all of the sodium was dissolved. Thereafter, 190 grams of dimethyl 2-hydroxyterephthalate were added to the solution, which was then heated to reflux. An additional 500 milliliters of ethanol was added at reflux. Subsequently, 243 grams of phenoxypentyl bromide were slowly added to the solution, and the resulting mixture was refluxed for a period of ten hours, accompanied by the formation of sodium bromide as a precipitate. Upon completion of the reflux period, ethanol was distilled off to a kettle temperature of 140° C. Heating was continued at a temperature in the range of 135° C. to 140° C. for a period of three hours, whereupon the mixture was allowed to stand overnight at room temperature. To this mixture 1 liter of diethyl ether was then added with stirring to dissolve the product, and 91 grams of insoluble sodium bromide was removed by filtration. Ether was removed from the filtrate by evaporation on a steam bath, and the residue was transferred to a distillation flask, whereupon unreacted phenoxypentyl bromide was distilled off to a kettle temperature of 180° C., under a reduced pressure of 2 milliliters of mercury. In this manner dimethyl 2-(5-phenoxypentoxy)terephthalate was obtained in an essentially quantitative yield as a water-clear viscosus liquid. *Analysis.*—Calculated for $C_{21}H_{24}O_6$: C, 67.72; H, 6.50. Found: C, 68.18; H, 7.07. Infrared analysis was consistent with the identity of the product.

To a 1-liter, 4-necked flask equipped with a stirrer, condenser, thermometer, and dropping funnel, there were charged 204 grams of acetic anhydride. The anhydride was cooled to a temperature of 0° C., whereupon 93 grams of sulfuric acid were added dropwise thereto, accompanied by stirring and continued cooling, so that the temperature of the resulting mixture was maintained at about 0° C. To this mixture there were slowly added a solution containing 335 grams of dimethyl 2-phenoxypentoxyterephthalate, obtained as described above, dissolved in 300 milliliters of ethylene dichloride. After stirring the resulting solution for four hours at a temperature maintained in the range of from 0° C. to 5° C., the solution was gradually warmed to room temperature over a period of 1.5 hours. Thereafter, 200 milliliters of methanol were added to the solution, which was then refluxed for a period of twenty minutes. The solution was subsequently transferred to an evaporating dish, from which the solvent present was evaporated upon standing overnight. In this manner dimethyl 2-[5-(4-sulfophenoxy)pentoxy]terephthalate was obtained as a residue product. The residue was then dissolved in 500 milliliters of methanol, transferred to a reaction flask, and refluxed for a period of five hours, while distilling off methyl acetate and any trace of ethylene dichloride still present. During the distillation, methanol was added to the solution to maintain a constant volume of about 850 milliliters. Thereafter, the solution was treated with charcoal and diluted to 1500 milliliters volume with methanol. An 850-milliliter portion of the solution was titrated with methanolic potassium hydroxide to a pH of 7.7. The mixture was diluted to 2.5 liters with methanol, heated to reflux, and then cooled to room temperature. A precipitate was formed and was recovered by filtration. Concentration of the filtrate yielded additional product. The solids were combined and extracted with methanol in a Soxhlet extractor. In this manner 180 grams of dimethyl 2-[5-(4-((potassiumsulfo))phenoxy)pentoxy]terephthalate were obtained as a white crystalline product. Another 100-milliliter portion of the methanolic dimethyl 2-[5-(4-sulfophenoxy)pentoxy]terephthalate solution obtained as described above was titrated with methanolic lithium hydroxide to pH 7.5. Upon evaporation of the solvent present, 31 grams of dimethyl 2-[5-(4-((lithiumsulfo))phenoxy)pentoxy]terephthalate were recovered as a solid residue product.

EXPERIMENT C

A mixture of 17.3 grams of dimethyl 5-(4-sodiumsulfophenoxyethoxy)isophthalate, 220 grams of di-2-ethylhexanol and 0.01 gram of zinc acetate was charged to a 30 mm. reactor. The latter was equipped with a sintered-glass plate at the bottom, which permitted the introduction of finely dispersed nitrogen. The gas was passed through the melt during the entire reaction period, thus facilitating the removal of by-products. The reaction mixture was heated at 187° C. to 192° C. for five and one half hours to bring about the ester exchange, while distilling the methanol formed during the reaction. Then, the reaction was maintained between 230° C. and 232° C. for one and one half hours to remove the excess di-2-ethylhexanol. The white solid which remained in the reactor was removed and washed thoroughly first with ether and then with acetone and dried. After 15 grams of the white, crystalline di-2-ethylhexyl 5-(4-sodiumsulfophenoxyethoxy)isophthalate was obtained in good purity; M.P. 321 to 326° C. under decomposition.

EXPERIMENT D

There was charged to a glass reaction flask equipped with a stirrer, air condenser, thermometer, and dropping funnel, 100 grams of 9,9-di-(2-carboxyethyl)-fluorene. Over a period of forty-five minutes, 200 grams of concentrated sulfuric acid (98 percent) was added in a dropwise manner as the temperature rose exothermically to 55° C. The mixture was stirred for two hours, and the temperature dropped to 30° C. Then the temperature was raised to 50° C. over a two-hour period by slowly heating the reaction, after which it was cooled to room temperature. The paste-like mixture was diluted with 150 milliliters of water and heated to 100° C. to solution, cooled, and the crystals recovered by filtration. The crystalline 9,9-di-(2-carboxyethyl)-fluorene-2-sulfonic acid was dissolved in hot dilute hydrochloric acid, treated with charcoal, filtered, the filtrate cooled, and filtered again. The crystals were recrystallized a second time from concentrated hydrochloric acid and dried. There was obtained 110 grams of 9,9-di-(2-carboxyethyl)-fluorene-2-sulfonic acid having a melting point of 217 to 220° C.

Reaction with sodium hydroxide to a pH of about 7 produces sodium 9,9-di-(2-carboxyethyl)-fluorene-2-sulfonate. In the same way the lithium, potassium, cesium, and rubidium sulfonate salts are produced using the appropriate bases.

The use of 9 - (2-carboxyethyl)-9-(5-carboxypentyl)-fluorene as starting material for the sulfonation reaction produces 9 - (2-carboxyethyl)-9-(5-carboxypentyl)-fluorene-2-sulfonic acid; and 9,9-di-(3-carboxypropyl)-fluorene-2-sulfonic acid is produced from 9,9-di-(3-carboxypropyl)-fluorene as starting material. The sodium and potassium salts are readily obtained from the free acids.

A mixture of 100 grams of the 9,9-di-(2-carboxyethyl)-fluorene-2-sulfonic acid and 800 milliliters of methanol was heated at the reflux temperature for five hours. Thereafter, the solution was concentrated to 150 milliliters and a small portion removed. From this portion 9,9-di-(2-carbomethoxyethyl)-fluorene-2-sulfonic acid is isolated by chilling and filtering. The remainder of the concentrated solution was diluted with an amount of methanol equal to that removed during the concentration. This solution was refluxed for five hours, cooled to room temperature, and the pH was adjusted to a value of 7.5 with methanolic sodium hydroxide. The solution was concentrated to about 300 milliliters, cooled, and the crystalline sodium 9,9-di-(2-carbomethoxyethyl)-fluorene-2-sulfonate was filtered. The crystals were recrystallized from a solution of pyridine and methanol, and dried. The saponification equivalent calculated for sodium 9,9-di-(2-carbomethoxyethyl)-fluorene-2-sulfonate is 220.2; the value found by analysis for the recrystallized product was 219.3. The structure of the sodium 9,9-di-(2-carbomethoxyethyl)-fluorene-2-sulfonate produced was further confirmed by infrared analysis.

In the same manner 9,9-di-(2-carbooctanoxyethyl)-fluorene-2-sulfonic acid is produced by reacting octanol with 9,9-di-(2 - carboxyethyl) - fluorene - 2 - sulfonic acid. The free sulfonic acid ester is readily converted to potassium 9,9-di-(2-carbooctanoxyethyl)-fluorene-2 - sulfonate by reaction with methanolic potassium hydroxide solution.

A warm solution of 448 grams of 9,9-di-(2-carbomethoxyethyl)-fluorene-2-sulfonic acid dissolved in 1 liter of warm methanol was reacted with a methanolic potassium hydroxide solution to a pH of 7.1. On cooling, potassium 9,9 - di - (2-carbomethoxyethyl)-fluorene-2-sulfonate crystallized and was filtered. After two recrystallizations from methanol, the white crystals melted at 203° C. to 204° C.

EXPERIMENT E

There was charged to a glass reaction flask equipped with a stirrer, condenser, and thermometer, 75 grams of 9,9-di-(2-carboxyethyl)-fluorene and 300 grams of concentrated sulfuric acid (98 percent). The reaction mixture was heated, with stirring, on a steam bath for two and a half hours, and then allowed to stand overnight at room temperature. The solution was poured into 250 milliliters of water, treated with charcoal, filtered, the filtrate cooled, chilled in a Dry-Ice bath for two hours, and filtered again. The 9,9-di-(2-carboxyethyl)-fluorene-2,7-disulfonic acid was recrystallized from 250 milliliters of concentrated hydrochloric acid yielding white crystals that melted at 260° C. to 262° C. A small portion of this purified disulfonic acid was again recrystallized from acetic acid, and the neutralization equivalent determined. The calculated neutralization equivalent is 117.61; the value found by analysis on this finally recrystallized sample was 117.68.

Neutralization of 9,9-di-(2-carboxyethyl)-fluorene-2,7-disulfonic acid with methanolic potassium hydroxide to a pH of about 7 produces dipotassium 9,9-di-(2-carboxyethyl)-fluorene-2,7-disulfonate.

A mixture of 46 grams of 9,9-di-(2-carboxyethyl)-fluorene-2,7-disulfonic acid and 400 milliliters of methanol was heated at reflux for five hours, and then cooled. From a small portion of the reaction mixture 9,9-di-(2-carbomethoxyethyl)-fluorene-2,7-disulfonic acid is recovered. The remainder of the reaction mixture was reacted with methanolic sodium hydroxide to a pH of 7.5 and a precipitate formed. The precipitate was filtered; the filtrate was concentrated on a steam bath, and on cooling a second crop of crystals was obtained and filtered. The two crystal fractions were combined and recrystallized from methanol to give the pure disodium 9,9-di-(2-carbomethoxyethyl) - fluorene - 2,7-disulfonate crystals, which were stable up to 340° C. The disulfonate was characterized by infrared analysis and elemental analysis. Calculated for $C_{21}H_{20}O_{10}SNa_2$: C, 46.49; H, 3.78; S, 11.82. Found: C, 45.95; H, 3.82; S, 11.83.

In a similar manner 9,9-di-(2-carbopentanoxyethyl)-fluorene-2,7-disulfonic acid is produced by esterifying 9,9-di-(2-carboxyethyl)-fluorene-2,7-disulfonic acid with pentanol. From this ester the dipotassium, dilithium, and dicesium salts are prepared by reaction with the appropriate hydroxide using the same procedure described above.

A mixture of 96 grams of 9,9-di-(2-carbomethoxyethyl)-fluorene-2,7-disulfonic acid was heated at reflux in 500 milliliters of methanol for eight hours, distilling most of the methanol and replacing with new methanol once. The solution was reacted with methanolic lithium hydroxide to a pH of 7.0 and the clear solution was evaporated on a steam bath to yield a clear viscous residue. After dissolving the residue in 150 milliliters of methanol, the solution was poured into 1 liter of ether and the precipitated solid, dilithium 9,9-di-(2-carbomethoxyethyl)-fluorene-2,7-disulfonate, was filtered. The crystals were dried at 100° C. at 1 mm. pressure and did not melt at 400° C.

In the following examples, the production of the low molecular weight polyesters and the use thereof to produce the blended compositions of this invention is set forth. These examples should not be construed as limiting the invention but merely serve to illustrate the operativeness thereof; parts are by weight unless otherwise specified.

Example 1

A mixture of 19.4 grams of dimethyl terephthalate, 22.5 grams of potassium 9,9-di-(2-carbomethoxyethyl)-fluorene-2-sulfonate, 40 grams of ethylene glycol, 0.017 gram of zinc acetate, and 0.001 gram of antimony oxide was charged to a polycondensation reactor. The latter was equipped with a sintered-glass plate at the bottom, which permitted the introduction of finely dispersed nitrogen. The gas was passed through the melt during the entire reaction period, thus facilitating the removal of condensation by-products. The reaction mixture was heated for 3.5 hours at 185° C. to 187° C. to bring about the ester exchange, while distilling the methanol formed during the reaction. Then the temperature was held at 194° C. to 220° C. for 0.5 hour to remove the glycol excess. The temperature was maintained between 230° C. and 236° C. for 13.0 hours to carry out the polycondensation. A vigorous stream of nitrogen was passed through the melt at atmospheric pressure. The white, amorphous polyester had a reduced viscosity of 0.19 and melted at 215° C. to 220° C.

A blend was prepared by mechanically mixing 90 parts of polypropylene in finely powdered form with 10 parts of the above polyester for about one hour. The blend was then dried in vacuo and melt spun at about 280° C. through a spinnerette having twenty-five holes, each 0.030 inch in diameter. The orifice velocity was 3.1 feet per minute and the take-up velocity was 465 feet per minute. The multifilament yarn was then stretched 220 percent in the steam atmosphere.

The multifilament yarn was knit into tubing, scoured, and dried. The knit tubing was readily dyed by Disperse Red 17 (Celliton Fast Red GGA, C.I. 11,210) and Basic Blue 4 (Sevron Blue 5G, C.I. 51,004) by the dyeing procedures set forth above.

Control dyeings on polypropylene fibers per se and on fibers of blends of polypropylene with conventional polyesters were either much lighter in shade or undyed.

For convenience, fiber properties and dyeing results of the examples are set forth in tabular form following the examples where available.

*Example 2*

A mixture of 9.7 grams of dimethyl terephthalate, 22.83 grams of potassium 9,9-di-(2-carbomethoxyethyl)-fluorene-2-sulfonate, 40 grams of ethylene glycol, 0.014 gram of zinc acetate, and 0.001 gram of antimony oxide was charged to a reactor and heated at 175° C. for 3.5 hours to bring about the ester exchange, while distilling the methanol formed during the reaction. Then the temperature was held at 180° C. to 220° C. for 0.5 hour to remove the glycol excess. The temperature was maintained between 225° C. and 255° C. for 11.9 hours to carry out the polycondensation. A vigorous stream of nitrogen was passed through the melt at atmospheric pressure. The light yellow, amorphous polyester had a reduced viscosity of 0.16 and melted at 222° C. to 226° C.

A blend was prepared using 90 parts of solid polypropylene and 10 parts of the above polyester as described in Example 1. The homogeneous blend was melt spun as in Example 1 to produce multifilament yarn which was knit into tubing and dyed with disperse and cationic dyes.

In a similar manner polyesters are produced by substitution for the potassium 9,9-di-(2-carbomethoxyethyl)-fluorene-2-sulfonate the compounds lithium 9,9-di-(3-carbopropoxypropyl) - fluorene - 2 - sulfonate or sodium 9,9 - di - (2 - carbooctanoxyethyl)-fluorene-2-sulfonate. These polyesters are compatible with propylene polymers and produce fibers which are readily dyed.

*Example 3*

A mixture of 3.6 grams of dimethyl azelate, 22.02 grams of sodium 9,9-di-(2-carbomethoxyethyl)-fluorene-2-sulfonate, 76 grams of propylene glycol, and 0.013 gram of zinc acetate was charged to a reactor and heated at 187° C. to 195° C. for three hours to bring about the reaction. Then the reaction was heated at 230° C. to 235° C. for 0.5 hour to remove the glycol excess. The temperature was maintained at 230° C. for one hour to carry out the polycondensation. A vigorous stream of nitrogen was passed through the melt at atmospheric pressure. The white, amorphous polyester had a reduced viscosity of 0.06, softened at 182° C. and was completely melted at 194° C.

A blend was prepared using 90 parts of solid polypropylene and 10 parts of the above polyester as described in Example 1. The homogeneous blend was melt spun as in Example 1 to produce multifilament yarn which was knit into tubing and dyed with disperse and cationic dyes.

*Example 4*

A mixture of 10.82 grams of dimethyl azelate, 22.02 grams of sodium 9,9-di-(2-carbomethoxyethyl)-fluorene-2-sulfonate, 62 grams of ethylene glycol, and 0.016 gram of zinc acetate was charged to a reactor and heated at 183° C. to 185° C. for three hours to bring about the ester exchange, while distilling the methanol formed during the reaction. Then the reaction was heated at 225° C. to 230° C. for 0.5 hour to remove the glycol excess. The temperature was maintained at 230° C. for one hour to carry out the polycondensation. A vigorous stream of nitrogen was passed through the melt at atmospheric pressure. The white, amorphous polyester had a reduced viscosity of 0.09, softened at 134° C., and was completely melted at 154° C.

A blend was prepared using 90 parts of solid polypropylene and 10 parts of the above polyester as described in Example 1. The homogeneous blend was melt spun as in Example 1 to produce multifilament yarn which was knit into tubing and dyed with disperse and cationic dyes.

*Example 5*

A mixture of 58.2 grams of dimethyl terephthalate, 67.5 grams of potassium 9,9-di-(2-carbomethoxyethyl)-fluorene-2-sulfonate, 120 grams of ethylene glycol, 0.015 gram of zinc acetate, and 0.003 gram of antimony oxide was charged to a reactor and heated at 189° C. to 190° C. for two hours to bring about the ester exchange, while distilling the methanol formed during the reaction. Then the reaction was heated at 220° C. to 230° C. for two hours to remove the glycol excess. The temperature was maintained between 229° C. and 230° C. for eight hours to carry out the polycondensation. A vigorous stream of nitrogen was passed through the melt at atmospheric pressure. The white, amorphous polyester had a reduced viscosity of 0.11 and melted at 220° C.

A blend was prepared using 90 parts of solid polypropylene and 10 parts of the above polyester as described in Example 1. The homogeneous blend was melt spun as in Example 1 to produce multifilament yarn which was knit into tubing and dyed with disperse and cationic dyes.

Similarly a polyester can be produced using dipotassium 9,9 - di - (2 - carboethoxyethyl) - fluorene - 2,7-disulfonate in place of the monosulfonated fluorene compound. When this polyester is blended with propylene polymers and spun, dyeable fibers are also produced. Both of the blends produce films which are printable by conventional printing procedures for polyolefin films.

*Example 6*

A mixture of 30 grams of potassium 9,9-di-(2-carbomethoxyethyl)-fluorene-2-sulfonate, 30 grams of 2-ethyl-1,5-pentanediol, 0.012 gram of zinc acetate, and 0.0006 gram of antimony oxide was charged to a reactor and heated at 176° C. to 184° C. for five hours to bring about the ester exchange, while distilling the methanol formed during the reaction. Then the reaction was heated at 185° C. to 233° C. for 0.75 hour to remove the glycol excess. The temperature was maintained between 230° C. and 233° C. for four hours and finally between at 230° C. to 232° C. at 1 to 3 mm. Hg for 3.0 hours to carry out the polycondensation. A vigorous stream of nitrogen was passed through the melt at atmospheric pressure. The amorphous polyester had a reduced viscosity of 0.05 and melted at 152° C. to 172° C.

A blend was prepared using 90 parts of solid polypropylene and 10 parts of the above polyester as described in Example 1. The homogeneous blend was melt spun as in Example 1 to produce multifilament yarn which was knit into tubing and dyed with disperse and cationic dyes.

In a similar manner polyesters are produced by substitution of disodium 9,9-di-(2-carbobutanoxyethyl)-fluorene-2,7-disulfonate for the potassium 9,9-di-(2-carbomethoxyethyl)-fluorene-2-sulfonate. This polyester produces homogeneous blends with propylene polymers which have improved dyeing properties.

*Example 7*

A mixture of 30 grams of potassium 9,9-di-(2-carbomethoxyethyl)-fluorene -2-sulfonate, 30 grams of diethylene glycol, 0.012 grams of zinc acetate, and 0.0006 gram of antimony oxide was charged to a reactor and heated at 177 to 187° C. for 5.75 hours to bring about the ester exchange, while distilling the methanol formed during the reaction. Then the reaction was heated at 225 to 230° C. for one hour to remove the glycol excess. The temperature was maintained between 225° C. and 230° C. for three hours and finally at 227 to 230° C. for three hours at 5 mm. Hg to carry out the polycondensation. A vigorous stream of nitrogen was passed through the melt at atmospheric pressure. The amorphous polyester had a reduced viscosity of 0.08.

A blend was prepared using 90 parts of solid polypropylene and 10 parts of the above polyester as described in Example 1. The homogeneous blend was melt spun as in Example 1 to produce multifilament yarn which was knit into tubing and dyed with disperse and cationic dyes.

*Example 8*

A mixture of 8.65 grams of dimethyl 5-(4-sodiumsulfophenoxyethoxy)isophthalate, 45.91 grams of 3-methyl-1,5-pentanediol, and 0.004 gram of zinc acetate was charged to a reactor and heated at 221 to 223° C for four hours to bring about the ester exchange, while distilling the methanol formed during the reaction. Then the reaction was heated at 221 to 233° C. for four hours to remove the glycol excess. The temperature was maintained between 236° C. and 237° C. for two hours to carry out the polycondensation. A vigorous stream of nitrogen was passed through the melt at atmospheric pressure. The amorphous polyester had a reduced viscosity of 0.06.

A blend was prepared using 90 parts of solid polypropylene and 10 parts of the above polyester as described in Example 1. The homogeneous blend was melt spun as in Example 1 to produce multifilament yarn which was knit into tubing and dyed with disperse and cationic dyes.

*Example 9*

A mixture of 4.33 grams of dimethyl azelate, 8.65 grams of dimethyl 5-(4-sodiumsulfophenoxyethoxy)isophthalate, 17.61 grams of propylene glycol and 0.0065 gram of zinc acetate was charged to a reactor and heated at 178 to 185° C. for 2.33 hours to bring about the ester exchange, while distilling the methanol formed during the reaction. Then the reaction was heated at 185 to 230° C. for 1.25 hours to remove the glycol excess. The temperature was maintained at 233° C. for 1.67 hours to carry out the polycondensation. A vigorous stream of nitrogen was passed through the melt at atmospheric pressure. The amorphous polyester had a reduced viscosity of 0.06.

A blend was prepared using 90 parts of solid polypropylene and 10 parts of the above polyester as described in Example 1. The homogeneous blend was melt spun as in Example 1 to produce multifilament yarn which was knit into tubing and dyed with disperse and cationic dyes.

Similarly, a polyester is produced using the di-2-ethylhexyl 5-(4-lithiumsulfophenoxyethoxy)isophthalate of Experiment C. The blends of this polyester with propylene polymers produce fibers which are readily dyed.

*Example 10*

A mixture of 5.77 grams of dimethyl azelate, 17.3 grams of dimethyl 5-(4-sodiumsulfophenoxyethoxy)isophthalate, 60 grams of propylene glycol, and 0.012 gram of zinc acetate was charged to a reactor and heated at 185 to 200° C. for 3.67 hours to bring about the ester exchange, while distilling the methanol formed during the reaction. Then the reaction was heated at 210 to 251° C. for 0.5 hour to remove the glycol excess. The temperature was maintained between 250° C. and 259° C. for 2.5 hours to carry out the polycondensation. A vigorous stream of nitrogen was passed through the melt at atmospheric pressure. The white, amorphous polyester had a reduced viscosity of 0.10 and melted at 237 to 238° C.

A blend was prepared using 90 parts of solid polypropylene and 10 parts of the above polyester as described in Example 1. The homogeneous blend was melt spun as in Example 1 to produce multifilament yarn which was knit into tubing and dyed with disperse and cationic dyes.

*Example 11*

A mixture of 6.97 grams of dimethyl adipate, 17.3 grams of dimethyl 5-(4-sodiumsulfophenoxyethoxy)isophthalate, 60 grams of ethylene glycol, and 0.012 gram of zinc acetate was charged to a reactor and heated at 190 to 192° C. for 2.25 hours to bring about the ester exchange, while distilling the methanol formed during the reaction. Then the reaction was heated at 231 to 235° C. for 0.75 hour to remove the glycol excess. The temperature was maintained between 260° C. and 261° C. for 3.25 hours to carry out the polycondensation. A vigorous stream of nitrogen was passed through the melt at atmospheric pressure. The white, amorphous polyester softened at 170° C. and was completely melted at 250° C.

A blend was prepared using 90 parts of solid polypropylene and 10 parts of the above polyester as described in Example 1. The homogeneous blend was melt spun as in Example 1 to produce multifilament yarn which was knit into tubing and dyed with disperse and cationic dyes.

*Example 12*

A mixture of 6.97 grams of dimethyl adipate, 17.3 grams of dimethyl 5-(4-sodiumsulfophenoxyethoxy)isophthalate, 60 grams of propylene glycol and 0.012 gram of zinc acetate was charged to a reactor and heated at 177 to 198° C. for 5.5 hours to bring about the ester exchange, while distilling the methanol formed during the reaction. Then the reaction was maintained between 184° C. and 262° C. for two hours in order to remove the glycol excess and to carry out the polycondensation. A vigorous stream of nitrogen was passed through the melt at atmospheric pressure. The white, amorphous polyester had a reduced viscosity of 0.08, softened at 135° C., and was completely melted at 230° C.

A blend was prepared using 90 parts of solid polypropylene and 10 parts of the above polyester as described in Example 1. The homogeneous blend was melt spun as in Example 1 to produce multifilament yarn which was knit into tubing and dyed with disperse and cationic dyes.

The use of dihexyl 5-(4-potassiumsulfophenoxybutoxy) isophthalate produces a similar polyester which is compatible with propylene polymers. The blends obtained thereby are readily formed into fibers and films having improved receptivity to dyes and inks.

*Example 13*

A mixture of 5.58 grams of dimethyl adipate, 20.75 grams of dimethyl 5-(4-sodiumsulfophenoxyethoxy)isophthalate, 69 grams of propylene glycol, and 0.0132 gram of zinc acetate was charged to a reactor and heated at 175 to 186° C. for 2.25 hours to bring about the ester exchange, while distilling the methanol formed during the reaction. Then the reaction was maintained between 180° C. and 258° C. for one hour in order to remove the glycol excess and to carry out the polycondensation. A vigorous stream of nitrogen was passed through the melt at atmospheric pressure. The white, amorphous polyester had a reduced viscosity of 0.07, softened at 170° C., and was completely melted at 230° C.

A blend was prepared using 90 parts of solid polypropylene and 10 parts of the above polyester as described in Example 1. The homogeneous blend was melt spun as in Example 1 to produce multifilament yarn which was knit into tubing and dyed with disperse and cationic dyes.

Example 14

A mixture of 14.43 grams of dimethyl azelate, 43.24 grams of dimethyl 5-(4-sodiumsulfophenoxyethoxy)isophthalate, 120 grams of propylene glycol, and 0.029 gram of zinc acetate was charged to a reactor and heated at 200 to 203° C. for 4.75 hours to bring about the ester exchange, while distilling the methanol formed during the reaction. Then the reaction was heated at 220 to 240° C. for 1.17 hours to remove the glycol excess. The temperature was maintained between 237° C. and 239° C. for 2.25 hours to carry out the polycondensation. A vigorous stream of nitrogen was passed through the melt at atmospheric pressure. The white, amorphous polyester had a reduced viscosity of 0.06, softened at 198° C., and was completely melted at 218° C.

A blend was prepared using 90 parts of solid polypropylene and 10 parts of the above polyester as described in Example 1. The homogeneous blend was melt spun as in Example 1 to produce multifilament yarn which was knit into tubing and dyed with disperse and cationic dyes.

Example 15

A mixture of 7.2 grams of dimethyl azelate, 43.238 grams of dimethyl 5-(4-sodiumsulfophenoxyethoxy)isophthalate, 120 grams of propylene glycol, and 0.025 gram of zinc acetate was charged to a reactor and heated at 196° C. for three hours to bring about the ester exchange, while distilling the methanol formed during the reaction. Then the reaction was heated at 218 to 241° C. for 0.5 hour to remove the glycol excess. The temperature was maintained between 235° C. and 242° C. for 2.0 hours to carry out the polycondensation. A vigorous stream of nitrogen was passed through the melt at atmospheric pressure. The white, amorphous polyester had a reduced viscosity of 0.08, softened at 233° C., and melted >265° C.

A blend was prepared using 90 parts of solid polypropylene and 10 parts of the above polyester as described in Example 1. The homogeneous blend was melt spun as in Example 1 to produce multifilament yarn which was knit into tubing and dyed with disperse and cationic dyes.

Example 16

A mixture of 28.86 grams of dimethyl azelate, 86.48 grams of dimethyl 5-(4-sodiumsulfophenoxyethoxy)isophthalate, 240 grams of ethylene glycol, and 3 drops of tetrabutyl titanate was charged to a reactor and heated at 178 to 186° C. for 3.5 hours to bring about the ester exchange, while distilling the methanol formed during the reaction. Then the temperature was maintained between 194° C. and 201° C. for 2.5 hours and finally at 197° C. to 199° C. at 18 to 70 mm. Hg for three hours to remove the glycol excess and carry out the polycondensation. A vigorous stream of nitrogen was passed through the melt at atmospheric pressure. The white, amorphous polyester melted above 265° C.

A blend was prepared using 90 parts of solid polypropylene and 10 parts of the above polyester as described in Example 1. The homogeneous blend was melt spun as in Example 1 to produce multifilament yarn which was knit into tubing and dyed with disperse and cationic dyes.

In the following examples the polypropylene blends of this invention were produced using the alkali metal sulfonate modifiers in the monomeric form.

Example 17

A blend was prepared using 95 parts of solid polypropylene and 5 parts of di-2-ethylhexyl 5-(4-sodiumsulfophenoxyethoxy)isophthalate and described in Example 1. This homogeneous blend was then melt spun as in Example 1 to produce multifilament yarn which was knit into tubing and dyed with disperse and cationic dyes.

Similar blends can be prepared from propylene polymers with dimethyl 4-(4-potassiumsulfophenoxyethoxy)-phthalate or dibutyl 5 - (4-lithiumsulfophenoxyethoxy)-terephthalate or dimethyl 5-(4-cesiumsulfophenoxypropoxy)isophthalate; and the blends so produced are readily extruded into fibers which are dyeable.

Example 18

A blend was prepared using 90 parts of solid polypropylene and 10 parts of dimethyl 5-(4-sodiumsulfophenoxyethoxy)isophthalate as described in Example 1, and then melt spun as therein described. The yarns were readily dyed.

Example 19

A blend was prepared using 90 parts of solid polypropylene and 10 parts of dimethyl 5-(4-sodiumsulfophenoxyethoxy)isophthalate as described in Example 1, and then melt spun as therein described. The yarns were readily dyed, and films of the blended composition are readily printed.

Example 20

A blend was prepared using 98 parts of solid polypropylene and 2 parts of potassium 9,9-di-(2-carbomethoxyethyl)-fluorene-2-sulfonate as described in Example 1, and then melt spun as therein described. The yarns were readily dyed.

Similarly, blends can be produced from propylene polymers with the corresponding sodium, lithium, cesium, or rubidium salt of the above-named fluorene compound. In addition, blends can be obtained using dipotassium 9,9-di-(2-carbomethoxyethyl)-fluorene-2,7-disulfonate or disodium 9,9 - di-(3-carbobutanoxypropyl)-fluorene-2,7-disulfonate. In all instances the blends form fibers which are readily dyed and films having improved printability properties.

In addition to polypropylene fibers per se as a control for the dyeability tests, a blend of a polyester of dimethyl sebacate and propylene glycol with a propylene polymer was prepared to observe the effect of a conventional polyester on the dyeability of polypropylene. This preparation is set forth below and is identified as Control II in the subsequent table. The polypropylene blend of this experiment was not dyeable with cationic dyes.

CONTROL II

Dimethyl sebacate (125 grams), propylene glycol (167 grams), and tetraisopropyl titanate (0.0625 gram) were charged to a 500 ml. 3-necked flask equipped with a gooseneck distilling head, thermometer, and a nitrogen inlet tube, then heated at 180° C. for eleven hours under a nitrogen atmosphere. Thereafter the excess propylene glycol was distilled and the residue was heated for three hours at 240° C. under a pressure of 1 mm. of Hg to obtain a clear, viscous product. The molecular weight of the polyester was found to be 4134 as determined by the hydroxyl number. Ninety parts of a solid polypropylene was milled with 10 parts of the above polyester and was then granulated, dried overnight, and spun between 260 and 280° C. on a screw-extruder as previously described.

The compositions of this invention produce fibers that are readily dyed as shown above. The dyed fibers have excellent wash fastness, crock fastness, gas-fading fastness, and dry cleaning fastness properties. This was entirely unexpected in view of the poorness of these properties in polypropylene fibers heretofore known.

| Example | Fiber Properties | | | | | K/S Values | |
|---|---|---|---|---|---|---|---|
| | Steam Stretch, percent | Tenacity, g.p.d. | Elongation, percent | Stiffness, g.p.d. | Shrinkage, Boiling Water, percent | Dye A | Dye B |
| 1 | 255 | 4.08 | 35.0 | 40.2 | 3.6 | 7.0 | 7.5 |
| 2 | 222 | 2.75 | 19.8 | 32.6 | 3.7 | 4.8 | 2.7 |
| 3 | 270 | 3.90 | 32.0 | 29.0 | 7.4 | 6.8 | 4.2 |
| 4 | 220 | 3.78 | 29.3 | 28.7 | 7.2 | 6.5 | 3.0 |
| 6 | 243 | 3.78 | 26.2 | 30.6 | 6.8 | 7.2 | 2.0 |
| 7 | 245 | 3.85 | 25.3 | 34.0 | 6.1 | 4.4 | 1.3 |
| 8 | 235 | 3.05 | 27.1 | 24.6 | 7.1 | | 2.6 |
| 9 | 108 | 1.4 | 43.0 | 13.8 | | 5.7 | 1.6 |
| 10 | 250 | 3.78 | 28.7 | 29.1 | 12.0 | 5.4 | 6.3 |
| 11 | 220 | 3.47 | 32.3 | 32.0 | 7.90 | 6.0 | 3.8 |
| 12 | 265 | 4.16 | 26.3 | 38.7 | 6.0 | 4.4 | 1.7 |
| 13 | 240 | 3.44 | 27.8 | 33.3 | 5.8 | 5.4 | 6.3 |
| 14 | 265 | 4.47 | 38.9 | 43.3 | 4.4 | 8.1 | 5.5 |
| 15 | 245 | 4.01 | 31.9 | 35.0 | 7.3 | 5.5 | 3.0 |
| 17 | 284 | 4.57 | 30.8 | 36.6 | 4.40 | 5.6 | 2.5 |
| 18 | 238 | 3.90 | 27.2 | 36.5 | 5.3 | 2.1 | 1.3 |
| 19 | 205 | 3.60 | 29.5 | 37.6 | 3.1 | 4.3 | 2.0 |
| 20 | 256 | 4.60 | 72.0 | 37.0 | 5.6 | 4.0 | |
| Con. I | | 4.1 | 44.0 | 30.0 | 5–7 | 1.7 | 0.0 |
| Con. II | | 2.4 | 33.0 | 24.0 | | | 0.0 |

A = Disperse Red 17 (C.I. 11,210).
B = Basic Blue 4 (C.I. 51,004).
Con. I = Polypropylene per se.
Con. II = Blend of polypropylene and dimethyl sebacate-propylene glycol polyester.

What is claimed is:
1. A composition comprising a blend of (A) from about 70 to 99 percent by weight of a solid polypropylene and (B) from about 1 to 30 percent by weight of a modifier, said modifier being a member selected from the group consisting of alkali metal sulfonates of the phenoxyalkoxyphenyldicarboxylic acid compounds of the formula

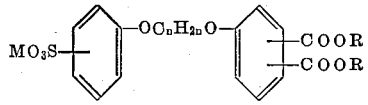

and alkali metal sulfonates of 9,9-di-(carboxyalkyl)-fluorene compounds of the formula

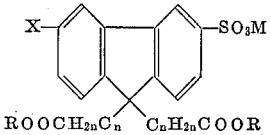

wherein M is an alkali metal atom; X is a member selected from the group consisting of hydrogen and —SO₃M; R is alkyl having from 1 to 10 carbon atoms; and $n$ is an integer having a value of from 2 to about 5; said modifier being present in said composition in the form selected from the group consisting of the monomeric form and the polymeric form as a low molecular weight polyester thereof with an aliphatic glycol containing from 2 to 10 carbon atoms; said low molecular weight polyester having a reduced viscosity of from about 0.01 to about 0.6 as determined at a polymer concentration of 0.2 gram per 100 milliliters of solution using a 3:2 mixture of phenol and tetrachloroethane as the solvent; and the percentages of (A) and (B) are based on the total weight of said composition.

2. The composition as claimed in claim 1, wherein component (A) is present at a concentration of from about 80 to 98.5 percent by weight and component (B) is present at a concentration of from about 1.5 to 20 percent by weight.

3. The composition comprising a blend of (A) from about 80 to 98.5 percent by weight of a solid polypropylene and (B) a modifier selected from the group consisting of low molecular weight polyesters of (a) alkali metal sulfonates of the phenoxyalkoxyphenyldicarboxylic acid compounds of the formula

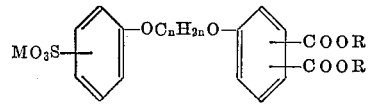

wherein M is an alkali metal atom; R is alkyl having from 1 to 10 carbon atoms; and $n$ is an integer having a value of from 2 to about 5; (b) at least one compound selected from the group consisting of the dicarboxylic acids and the alkyl esters thereof; and (c) an aliphatic glycol containing from 2 to 10 carbon atoms; said modifier being present at a concentration that results in a 1.5 to 20 percent by weight concentration of said alkali metal sulfonate of the phenoxyalkoxyphenyldicarboxylic acid compound in said composition; said low molecular weight polyester having a reduced viscosity of from about 0.01 to about 0.6 as determined at a polymer concentration of 0.2 gram per 100 milliliters of solution using a 3:2 mixture of phenol and tetrachloroethane as the solvent; and the percentages of (A) and (B) are based on the total weight of said composition.

4. The composition as claimed in claim 3, wherein component (B) is a low molecular weight polyester of dimethyl azelate, dimethyl 5-(4-sodiumsulfophenoxyethoxy)isophthalate, and propylene glycol.

5. The composition as claimed in claim 3, wherein component (B) is a low molecular weight polyester of dimethyl azelate, dimethyl 5-(4-sodiumsulfophenoxyethoxy)isophthalate, and ethylene glycol.

6. The composition as claimed in claim 3, wherein component (B) is a low molecular weight polyester of dimethyl adipate, dimethyl 5-(4-sodiumsulfophenoxyethoxy)isophthalate, and propylene glycol.

7. The composition as claimed in claim 3, wherein component (B) is a low molecular weight polyester of dimethyl adipate, dimethyl 5-(4-sodiumsulfophenoxyethoxy)isophthalate, and ethylene glycol.

8. The composition comprising a blend of (A) from about 80 to 98.5 percent by weight of a solid polypropylene and (B) a modifier selected from the group consisting of low molecular weight polyesters of (a) alkali metal sulfonates of the phenoxyalkoxyphenyldicarboxylic acid compounds of the formula

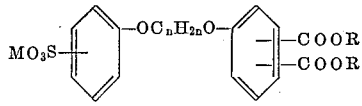

wherein M is an alkali metal atom; R is alkyl having from 1 to 10 carbon atoms; and $n$ is an integer having a value of from 2 to about 5 and (b) an aliphatic glycol containing from 2 to 10 carbon atoms; said modifier being present at a concentration that results in a 1.5 to 20 percent by weight concentration of said alkali metal sulfonate of the phenoxyalkoxyphenyldicarboxylic acid compound in said composition; said low molecular weight polyester having a reduced viscosity of from about 0.01 to about 0.6 as determined at a polymer concentration of 0.2 gram per 100 milliliters of solution using a 3:2 mixture of phenol and tetrachloroethane as the solvent; and the percentages of (A) and (B) are based on the total weight of said composition.

9. The composition as claimed in claim 8, wherein component (B) is a low molecular weight polyester of dimethyl 5-(4-sodiumsulfophenoxyethoxy)isophthalate and 3-methyl-1,5-pentanediol.

10. The composition comprising a blend of (A) from about 80 to 98.5 percent by weight of a solid polypropylene and (B) a modifier selected from the group consisting of alkali metal sulfonates of the phenoxyalkoxyphenyldicarboxylic acid compounds of the formula

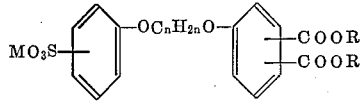

where M is an alkali metal atom; R is alkyl having from 1 to 10 carbon atoms; and $n$ is an integer having a value of from 2 to about 5; said modifier being present at a concentration that results in a 1.5 to 20 percent by weight concentration of said alkali metal sulfonate of the phenoxyalkoxyphenyldicarboxylic acid compound in said composition.

11. The composition as claimed in claim 10, wherein component (B) is di-2-ethylhexyl 5-(4-sodiumsulfophenoxyethoxy)isophthalate.

12. The composition comprising a blend of (A) from about 80 to 98.5 percent by weight of a solid polypropylene and (B) a modifier selected from the group consisting of low molecular weight polyesters of (a) alkali metal sulfonates of 9,9-di-(carboxyalkyl)-fluorene compounds of the formula

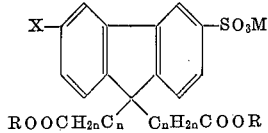

wherein M is an alkali metal atom; X is a member selected from the group consisting of hydrogen and —SO$_3$M; R is alkyl having from 1 to 10 carbon atoms; and $n$ is an integer having a value of from 2 to about 5; (b) at least one compound selected from the group consisting of the dicarboxylic acids and the alkyl esters thereof; and (c) an aliphatic glycol containing from 2 to 10 carbon atoms; said modifier being present at a concentration that results in a 1.5 to 20 percent by weight concentration of said alkali metal sulfonate of 9,9-di-(carboxyalkyl)-fluorene compound in said composition; said low molecular weight polyester having a reduced viscosity of from about 0.01 to about 0.6 as determined at a polymer concentration of 0.2 gram per 100 milliliters of solution using a 3:2 mixture of phenol and tetrachloroethane as the solvent; and the percentages of (A) and (B) are based on the total weight of said composition.

13. The composition as claimed in claim 12, wherein component (B) is a low molecular weight polyester of dimethyl terephthalate, potassium 9,9-di-(2-carbomethoxyethyl)-fluorene-2-sulfonate and ethylene glycol.

14. The composition as claimed in claim 12, wherein component (B) is a low molecular weight polyester of dimethyl azelate, sodium 9,9-di-(2-carbomethoxyethyl)-fluorene-sulfonate and ethylene glycol.

15. The composition comprising a blend of (A) from about 80 to 98.5 percent by weight of a solid polypropylene and (B) a modifier selected from the group consisting of low molecular weight polyesters of (a) alkali metal sulfonates of 9,9-di-(carboxyalkyl)-fluorene compounds of the formula

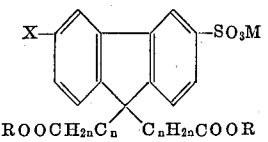

wherein M is an alkali metal atom; X is a member selected from the group consisting of hydrogen and —SO$_3$M; R is alkyl having from 1 to 10 carbon atoms; and $n$ is an integer having a value of from 2 to about 5; and (b) an aliphatic glycol containing from 2 to 10 carbon atoms; said modifier being present at a concentration that results in a 1.5 to 20 percent by weight concentration of said alkali metal sulfonate of the phenoxyalkoxyphenyldicarboxylic acid compound in said composition; said low molecular weight polyester having a reduced viscosity of from about 0.01 to about 0.6 as determined at a polymer concentration of 0.2 gram per 100 milliliters of solution using a 3:2 mixture of phenol and tetrachlroethane as the solvent; and the percentages of (A) and (B) are based on the total weight of said composition.

16. The composition as claimed in claim 15, wherein component (B) is a low molecular weight polyester of potassium 9,9-di-(2-carbomethoxyethyl)-fluorene-2-sulfonate and 2-ethyl-1,5-pentanediol.

17. The composition comprising a blend of (A) from about 80 to 98.5 percent by weight of a solid polypropylene and (B) a modifier selected from the group consisting of alkali metal sulfonates of 9,9-di-(carboxyalkyl)-fluorene compounds of the formula

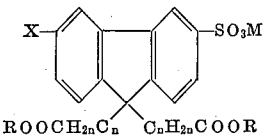

wherein M is an alkali metal atom; X is a member selected from the group consisting of hydrogen and —SO$_3$M; R is alkyl having from 1 to 10 carbon atoms; and $n$ is an integer having a value of from 2 to about 5; said modifier being present at a concentration that results in a 1.5 to 20 percent by weight concentration of said alkali metal sulfonate of the 9,9-di-(carboxyalkyl)-fluorene compound in said composition.

18. The composition as claimed in claim 17, wherein component (B) is sodium 9,9-di-(2-carbomethoxyethyl)-fluorene-2-sulfonate.

19. The composition of claim 1 in the form of a filament.

20. The composition of claim 1 in the form of a film.

References Cited by the Examiner

UNITED STATES PATENTS

| 3,003,845 | 10/1961 | Ehlers | 260—873 |
| 3,077,493 | 2/1963 | Horn | 260—75 |
| 3,096,358 | 7/1963 | Horn | 260—429.7 |
| 3,164,566 | 1/1965 | Horn | 260—75 |
| 3,164,570 | 1/1965 | Horn | 260—75 |

FOREIGN PATENTS 549,179   7/1956   Belgium.

WILLIAM H. SHORT, *Primary Examiner.*

C. W. WENDEL, *Assistant Examiner.*